United States Patent
Morecroft et al.

(10) Patent No.: US 11,625,235 B2
(45) Date of Patent: Apr. 11, 2023

(54) PROGRAM INSTALLATION IN A VIRTUAL ENVIRONMENT

(71) Applicant: HEWLETT PACKARD ENTERPRISE DEVELOPMENT LP, Houston, TX (US)

(72) Inventors: Lee M. Morecroft, Bracknell (GB); Peter Guyan, Bracknell (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 18 days.

(21) Appl. No.: 17/213,376

(22) Filed: Mar. 26, 2021

(65) Prior Publication Data
US 2022/0308860 A1 Sep. 29, 2022

(51) Int. Cl.
*G06F 8/656* (2018.01)
*G06F 8/61* (2018.01)
*G06F 9/455* (2018.01)

(52) U.S. Cl.
CPC .............. *G06F 8/656* (2018.02); *G06F 8/61* (2013.01); *G06F 9/45558* (2013.01); *G06F 2009/45562* (2013.01); *G06F 2009/45595* (2013.01)

(58) Field of Classification Search
CPC ........ G06F 8/656; G06F 8/61; G06F 9/45558; G06F 2009/45562; G06F 2009/45595
See application file for complete search history.

(56) References Cited

U.S. PATENT DOCUMENTS

| | | | |
|---|---|---|---|
| 6,269,442 B1 * | 7/2001 | Oberhauser | G06F 8/656 713/1 |
| 6,684,396 B1 * | 1/2004 | Brittain | G06F 11/1433 714/13 |
| 6,842,175 B1 * | 1/2005 | Schmalstieg | G06F 3/011 345/427 |
| 8,701,103 B1 | 4/2014 | Hsu et al. | |
| 8,782,632 B1 * | 7/2014 | Chigurapati | G06F 8/656 717/172 |
| 8,843,922 B2 * | 9/2014 | Takahashi | G06F 9/45537 718/1 |
| 9,178,784 B2 | 11/2015 | Ballew et al. | |
| 10,360,050 B2 | 7/2019 | He et al. | |
| 10,795,660 B1 * | 10/2020 | Sundresh | G06F 8/48 |
| 2003/0154264 A1 * | 8/2003 | Martin | H04L 41/0213 709/221 |

(Continued)

OTHER PUBLICATIONS

Chang S. et al., Customized HPC Cluster Software Stack on QCT Developer Cloud, (Research Paper), IEEE 4th International Conference on Cyber Security and Cloud Computing (CSCloud), Jun. 26, 2017, vol. No. 1, 2 Pgs.

(Continued)

*Primary Examiner* — Phillip H Nguyen
(74) *Attorney, Agent, or Firm* — Trop, Pruner & Hu, P.C.

(57) ABSTRACT

In some examples, a system creates a virtual environment in a computing environment, the virtual environment having a configuration corresponding to a configuration of the computing environment. The system installs, in the virtual environment, a second version of a program while a first version of the program is running in the computing environment, the installing to update the program during a live operation of the computing environment in which the first version of the program is performing a workload.

20 Claims, 4 Drawing Sheets

(56) References Cited

U.S. PATENT DOCUMENTS

| | | | |
|---|---|---|---|
| 2008/0295088 A1* | 11/2008 | Bhat | G06F 8/656 717/170 |
| 2009/0198769 A1* | 8/2009 | Keller | G06F 9/44536 709/203 |
| 2011/0208929 A1* | 8/2011 | McCann | G06F 3/0664 718/1 |
| 2012/0291021 A1* | 11/2012 | Banerjee | G06F 9/45558 717/173 |
| 2013/0047160 A1* | 2/2013 | Conover | G06F 9/455 718/1 |
| 2013/0152077 A1* | 6/2013 | Leitman | G06F 8/65 718/1 |
| 2014/0304698 A1* | 10/2014 | Chigurapati | G06F 8/656 717/171 |
| 2016/0162279 A1* | 6/2016 | Zamir | G06F 8/65 717/170 |
| 2021/0185095 A1* | 6/2021 | Harel | H04L 63/20 |

OTHER PUBLICATIONS

Huang W. et al., A Case for High Performance Computing with Virtual Machines, (Research Paper), ICS '06: Proceedings of the 20th annual international conference on Supercomputing, Jun. 28, 2006, 10 Pgs.

* cited by examiner

PROGRAM INSTALLATION IN A VIRTUAL ENVIRONMENT

BACKGROUND

A computing environment can include a computing node or multiple computing nodes. A program can be executable on the computing node(s). A program includes machine-readable instructions, which can be part of software, firmware, or another type of code. Over time, the program can be upgraded to newer versions.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some cases, a rolling upgrade of a program can be performed, such as to perform a minor upgrade. For example, a minor upgrade can include providing a program patch that can be applied to the program to upgrade the program.

In other cases, a major upgrade may have to be performed, which may involve a re-installation of the program. Re-installing a program can include installing a new version of the program to replace a prior version of the program, where the prior version of the program may be inactivated or deleted.

Examples of programs that can be upgraded include an operating system, management software, firmware (such as a boot program for booting a computing node), and so forth. In some examples, a management software can perform certain management tasks with respect to computing nodes. For example, the management software can manage the installation of software, such as an OS and/or another program, into each of the computing nodes 106-1 to 106-N. The management software can also perform monitoring of the computing nodes, power control of the computing nodes, and/or other management tasks.

A "computing node" can refer to a number of computers, where a "number" can refer to one or more than one. Examples of computers include server computers, desktop computers, notebook computers, communication nodes (e.g., switches, routers, etc.), storage controllers, and so forth.

When a major upgrade is performed in which a program is a re-installed, a computing environment in which the program is being re-installed may have to be taken offline, such that the computing environment is unavailable to execute the program. In a large computing environment that can include a cluster of computing nodes, re-installation of a program can take a relative long period of time, from many hours to days or even weeks. While the computing environment remains unavailable, workload cannot be performed, which can adversely affect users of the computing environment.

In accordance with some implementations of the present disclosure, a program upgrade, including a program upgrade in which a new version of a program is being re-installed, can be performed in a computing environment while the computing environment remains live. The computing environment remaining "live" can refer to the computing environment continuing to execute a prior version of the program in parallel with the installation of the new version of the program, such that the prior version of the program can continue to perform a workload during the installation of the new version of the program. In some implementations, a virtual environment is created in the computing environment, and the installation of the new version of the program occurs in the virtual environment while the computing environment continues to execute the prior version of the program to perform workloads.

Figure 1:
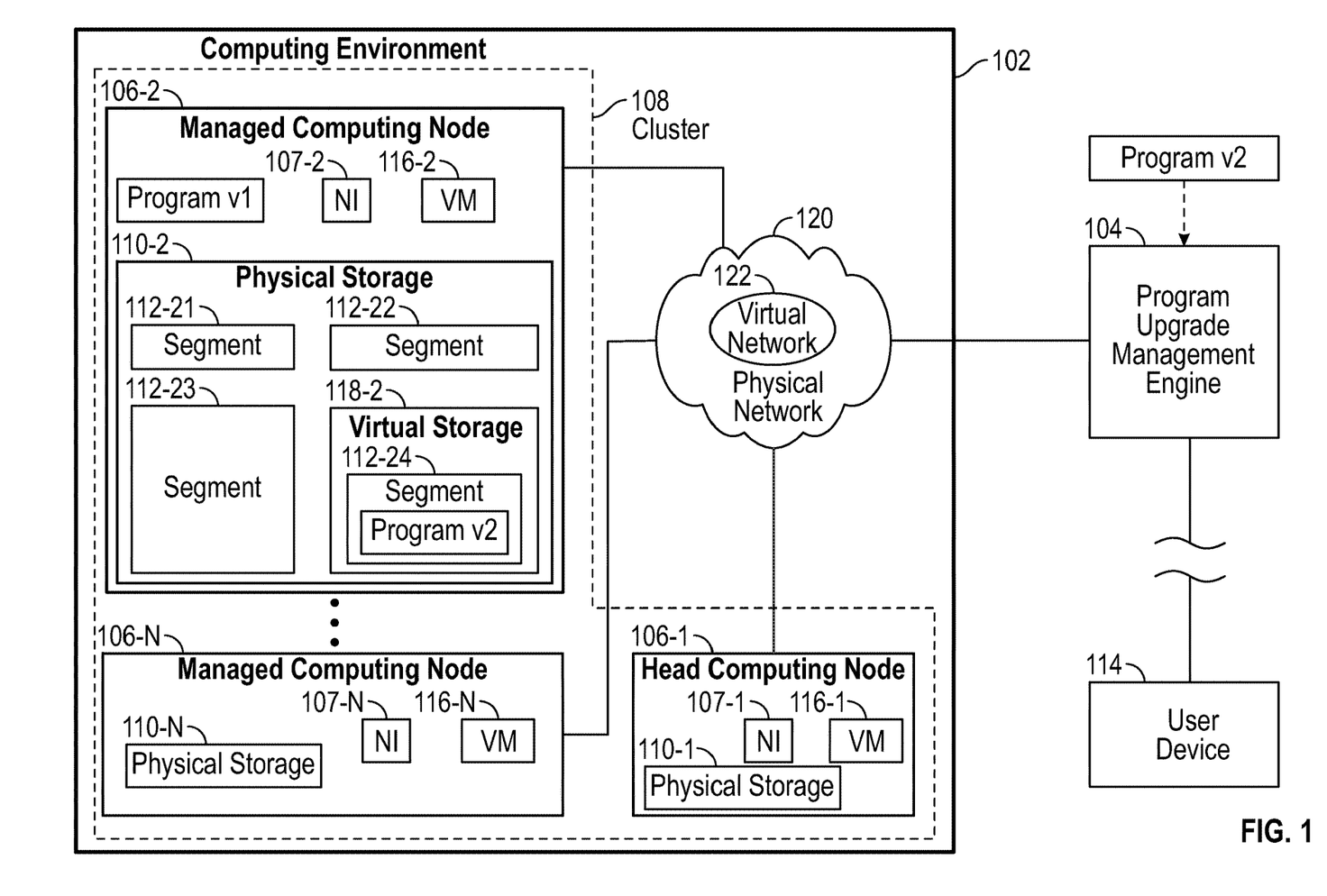
FIG. 1 is a block diagram of an arrangement that includes a computing environment and a program upgrade management engine, according to some examples.

FIG. 1 is a block diagram of an example arrangement that includes a computing environment 102 and a program upgrade management engine 104 that manages upgrades of programs in the computing environment 102.

As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

Although FIG. 1 shows the program upgrade management engine 104 as being outside of the computing environment 102, in other examples, the program upgrade management engine 104 can be included in the computing environment 102, such as in one or a combination of the computing nodes 106-1, 106-2, and 106-N, where N≥2.

The computing environment 102 includes a cluster 108 of computing nodes, which includes the computing nodes 106-1, 106-2, and 106-N. The cluster 108 of computing nodes can include two computing nodes or more than two computing nodes.

Although examples refer to a computing environment that includes multiple computing nodes, it is noted that in other examples, the program upgrade management engine 104 can be used with a computing environment that includes just one computing node.

Also, the computing environment 102 may include more than one cluster of computing nodes that can be managed by the program upgrade management engine 104.

The computing environment 102 further includes a physical network 120. The computing nodes 106-1 to 106-N are able to communicate with one another over the physical network 120. The physical network 120 can include a local area network (LAN), a wide area network (WAN), a public network, so forth.

In some examples, the physical network 120 is a dedicated management network over which communications relating to management tasks are communicated. A management network can differ from a separate data network (not shown) over which "normal" data communications are to occur. "Normal" data communications refer to data communications associated with workloads performed by the computing nodes 106-1 to 106-N. In alternative examples, the management network can also be a data network for normal data communications.

Each computing node 106-*i* (i=1 to N) includes a respective network interface 107-*i*. The network interface 107-*i* can include a hardware network interface controller that includes a transceiver to transmit and receive signals over the physical network 120. The network interface 107-*i* can also include machine-readable instructions to implement network protocols for communications over the physical network 120.

Each of the computing nodes 106-1 to 106-N can execute a current version of a program, represented as Program v1 in FIG. 1. Examples of programs that can be executed in each computing node 106-1 to 106-N can include any or some combination of the following: an OS, management software, firmware, and so forth.

In some examples, the cluster 108 of computing nodes includes a head computing node (106-1) and managed computing nodes (106-2 to 106-N). The head computing node 106-1 can perform management of the managed computing nodes 106-2 to 106-N. As an example, each of the computing nodes 106-1 to 106-N can execute management software, where the management software in the head computing node 106-1 controls various management tasks (including those listed above) with respect to the managed computing nodes 106-2 to 106-N.

In accordance with some implementations of the present disclosure, the program upgrade management engine 104 can install a new version of the program, referred to as "Program v2" in FIG. 1, into the computing environment 102 while the computing environment 102 remains live, i.e., the computing environment 102 (or more specifically, the cluster 108 of computing nodes) continues to execute the current version of the program (Program v1). Note that Program v2 is to be installed into each computing node of the cluster 108 of computing nodes.

Program v2 may be transmitted to or retrieved by the program upgrade management engine 104. For example, a user at the user device 114 can cause Program v2 to be sent by the user device 114 to the program upgrade management engine 104 for installation into the computing environment 102. As another example, the program upgrade management engine 104 can retrieve Program v2 from a specified storage location upon request or in response to an event (e.g., scheduled maintenance event, event relating to a fault or error, etc.).

Program v1 can continue to execute in the computing nodes 106-1 to 106-N while the program upgrade management engine 104 installs Program v2 into each of the computing nodes 106-1 to 106-N.

As shown in FIG. 1, each of the computing nodes 106-1 to 106-N includes a respective physical storage 110-1 to 110-N. The physical storage 110-*i* (i=1 to N) can be implemented using a storage device or multiple storage devices. Examples of storage devices can include any or some combination of the following: a disk-based storage device, a solid-state storage device, a memory device, and so forth. Although FIG. 1 shows the corresponding physical storage 110-*i* as being part of the respective computing node 106-*i*, it is noted that in other examples, the physical storage 110-*i* can be external of but communicatively coupled to the computing node 106-*i*.

Each physical storage 110-*i* can be divided into a number of storage segments. For example, FIG. 1 shows the physical storage 110-2 divided into multiple storage segments 112-21, 112-22, 112-23, and 112-24. Although a specific quantity of storage segments is depicted in FIG. 1, in other examples, other quantities of storage segments can be included in a physical storage 110-*i*.

A "storage segment" can refer to any subset of the physical storage 110-2 that is less than the entirety of the physical storage 110-2. Different storage segments of the physical storage 110-2 can store data for different data sources or for different purposes. For example, some storage segments can be used to store data, while other storage segments can be used to store machine-readable instructions.

In some examples, different terminologies can be used for the segments. For example, a storage segment can include a storage slot or a storage partition. A storage slot can include a number (one or greater than one) of storage partitions.

To install Program v2 into the cluster 108 of computing nodes while the cluster 108 of computing notes continue to execute Program v1, the program upgrade management engine 104 creates a virtual environment in the computing environment 102. Program v2 is installed into the virtual environment.

A "virtual environment" can refer to an emulated computing environment (emulated using machine-readable instructions) to simulate a real computing environment. The virtual environment can utilize physical resources (e.g., a processing resource, a storage resource, a communication resource, etc.) and appear to be a real computing environment to another entity, such as a user, a machine, or a program.

The installation of Program v2 can be performed automatically by the program upgrade management engine 104 in response to a detected event, or alternatively, can be requested by a user that is at a user device 114. A "user device" can refer to any electronic device that is accessible by the user. Examples of user devices can include any or some combination of the following: a desktop computer, a notebook computer, a tablet computer, a smart phone, and so forth.

The virtual environment created by the program upgrade management engine 104 can include virtual machines (VMs) 116-1 to 116-N in the respective computing nodes 106-1 to 106-N. A VM 116-*i* emulates a physical machine, such as the respective computing node 106-*i*. In other examples, instead of using VMs, the virtual environment can include other types of virtual sub-environments in the respective computing nodes 106-1 to 106-N, such as containers and so forth.

The virtual environment further includes respective virtual storages presented to the VMs 116-1 to 116-N. Each virtual storage is defined on the physical storage 110-*i* for the respective VM 116-*i*. A "virtual storage" can refer to logical storage that is not physically present. However, storage in the virtual storage is uses a portion of the physical storage that corresponds to the virtual storage. In the example of FIG. 1, a virtual storage 118-2 is defined on a storage segment 112-24 of the physical storage 110-2. The VM 116-2 in the computing node 106-2 has access to the virtual storage 118-2, and can read and write data to the virtual storage 118-2. When the VM 116-2 reads from the virtual storage 118-2, the read data is retrieved from the underlying storage segment 112-24 and provided to the to the VM 116-2. When the VM 116-2 writes to the virtual storage 118-2, the write data is written to the storage segment 112-24.

Each VM 116-$i$ has access to a similar corresponding virtual storage defined on a respective storage segment of the respective physical storage 110-$i$.

The virtual environment created by the program upgrade management engine 104 further includes a virtual network 122, such as a virtual local area network (VLAN) or another type of virtual network. A "virtual network" can refer to an emulated network implemented using machine-readable instructions. Traffic communicated through the virtual network uses communication resources of the physical network 120. In some examples, the virtual network 122 can be a virtual dedicated management network used for purposes of installing a new version of a program.

The VMs 116-1 to 116-N can communicate data over the virtual network 122. The data communicated over the virtual network 122 can be isolated from data of the computing nodes 106-1 to 106-N communicated over the physical network 120. Data of the virtual network 122 is isolated from data of the physical network 120 if entities (such as Program v1) of the computing nodes 106-1 to 106-N are unable to access the data communicated over the virtual network 122. The data communicated among the VMs 116-1 to 116-N over the virtual network 122 can include the machine-readable instructions of Program v2 being installed by the program upgrade management engine 104 into the cluster 108 of the computing nodes.

In accordance with some examples of the present disclosure, the program upgrade management engine installs Program v2 into each VM 116-$i$, which causes the machine-readable instructions of Program v2 to be written to the respective virtual storage. For example, the machine-readable instructions of Program v2 are written to the virtual storage 118-2, which results in the machine-readable instructions of Program v2 being written to the corresponding storage segment 112-24 (as shown in FIG. 1).

In some examples, it is assumed that Program v1 uses the storage segment 112-23, and Program v2 uses the storage segment 112-24. A program uses a storage segment if the storage segment stores machine-readable instructions of the program or the program stores data in the storage segment during execution of the program. In other examples, Program v1 can use a set of multiple storage segments, and Program v2 can use another set of multiple storage segments.

In some examples, a configuration of the virtual environment created by the program upgrade management engine 104 for installing the new version of the program (Program v2 in the example of FIG. 1) corresponds to a configuration of the computing environment 102. A "configuration" can refer to a collection of properties of a machine (whether virtual or physical). A collection of properties can include just one property or multiple properties. Examples of properties can include a name or other identifier of a network interface, a size of a storage segment, and so forth.

For example, a size of a storage segment to be included in the virtual storage to be used by the new version of the program (e.g., Program v2) can match the size of a storage segment used by the current version of the program (e.g., Program v1). Some of the storage segments of a physical storage 110-$i$ may be unused. Such unused storage segments are candidates to be used by the new version of the program. An unused storage segment can be selected for the virtual storage to be used by the new version of the program. The selected unused storage segment can be one in which the size of the unused storage segment matches the storage segment used by the installed current version of the program. The size of the storage segment for a virtual storage "matches" the size of the storage segment used by the current version of the program if the sizes are at the same or if the sizes are within a specified tolerance of one another (e.g., within ±2%, 5%, 10%, 20%, 30%, etc.).

In some examples, the program upgrade management engine 104 can set a configuration of a VM 116-$i$ based on the configuration of the corresponding computing node 106-$i$. The configuration of the VM 116-$i$ can be set to match the configuration of the respective computing node 106-$i$. For example, the network interface 107-$i$ of the computing node 106-$i$ can have a name or another identifier. The program upgrade management engine 104 can set the name or other identifier of a virtual network interface that is part of the VM 116-$i$ to be the same as the name or other identifier of the network interface 107-$i$. More generally, a configuration of hardware (e.g., processor, memory, an input/output (I/O) device, etc.) and/or machine-readable instructions (e.g., firmware, OS, etc.) of the VM 116-$i$ can be set based on the configuration of the hardware and/or machine-readable instructions of the corresponding computing node 106-$i$.

Although FIG. 1 shows just one virtual network 122 for communications of the VMs 116-1 to 116-N, it is noted that an additional virtual network can be created for other purposes, such as to functionally test the new version of the program (Program v2) installed into the VMs 116-1 to 116-N. Functional testing can include starting the new version of the program and observing a behavior of the new version of the program during execution in the VMs 116-1 to 116-N. The observed behavior can be compared to an expected behavior to determine if the new version of the program is executing in an expected manner.

Figure 2:
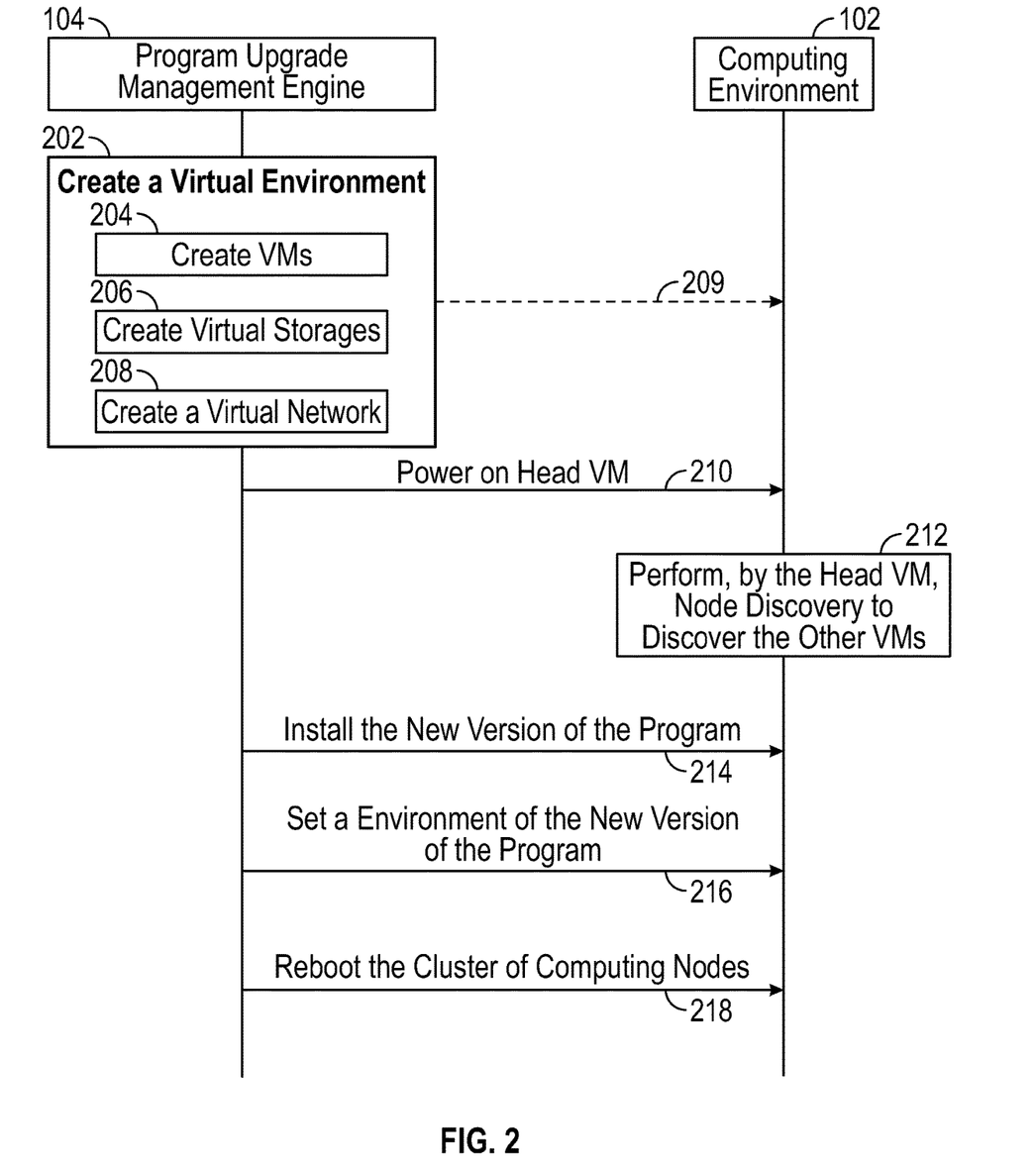
FIG. 2 is a flow diagram of a process according to some examples.

FIG. 2 is a flow diagram of a process of program installation in accordance with some examples of the present disclosure. The program upgrade management engine 104 creates (at 202) a virtual environment in a computing environment (e.g., 102 in FIG. 1). The virtual environment can be created based on the program upgrade management engine 104 sending instructions (represented by dashed arrow 209) to the computing environment 102 to create respective virtual entities in the cluster 108 of computing nodes, where the virtual entities can include VMs, virtual storages, and a virtual network.

The creation of the virtual environment includes creating (at 204) VMs, creating (at 206) a virtual storage for each VM, and creating (at 208) a virtual network. The created VMs have configurations that are based on configurations of the respective computing nodes on which the VMs execute. The created virtual storage presented to a respective VM includes an unused storage segment having a size that matches the size of a storage segment storing the current version of the program to be upgraded. The created virtual network is useable for management traffic.

Once the virtual environment has been created, the program upgrade management engine 104 can start the program installation process. For example, the program upgrade management engine 104 can power on (at 210) the VM 116-1 in the head computing node 106-1 first, by sending a VM power on instruction to the head computing node 106-1.

Since a VM is a virtual entity, "powering on" a VM can refer to starting the VM such that the VM starts executing.

The VM 116-1 can be referred to as the "head VM." The head VM 116-1 can perform (at 212) node discovery to discover the other VMs that are part of a cluster (e.g., the VMs 116-2 to 116-N on respective computing nodes 106-2 to 106-N). To perform the node discovery of other VMs, a mechanism can be provided to allow the head VM 116-1 to trigger the powering on of the other VMs. For example, the head VM 116-1 can use a management processor (not shown) in the head computing node 106-1 to perform powering on of the other VMs.

In some examples, the management processor includes a baseboard management controller (BMC), which can be separate from a main processor of the computing node 106-1. As used herein, a "BMC" is a specialized service controller that monitors the physical state of a computing node using sensors and communicates with a remote management system (that is remote from the computing system) through an independent "out-of-band" connection. The BMC has management capabilities to manage components of the computing node. Examples of management capabilities of the BMC can include any or some combination of the following: power control to perform power management of the computing system (such as to transition the computing system between different power consumption states in response to detected events), thermal monitoring and control of the computing system (such as to monitor temperatures of the computing system and to control thermal management devices of the computing system), fan control of fans in the computing system, system health monitoring based on monitoring measurement data of various sensors of the computing system, remote access of the computing system (to access the computing system over a network, for example), remote reboot of the computing system (to trigger the computing system to reboot using a remote command), system setup and deployment of the computing system, system security to implement security procedures in the computing system, and so forth.

In some examples, the BMC can provide so-called "lights-out" functionality for computing nodes. The lights out functionality may allow a user, such as a systems administrator, to perform management operations on the computing system even if the OS is not installed or not functional on the computing system.

Moreover, in some examples, the BMC can run on auxiliary power provided by an auxiliary power supply (e.g., a battery); as a result, the computing system does not have to be powered on to allow the BMC to perform the BMC's operations. The auxiliary power supply is separate from a main power supply that supplies powers to other components (e.g., the main processor, etc.) of the computing system.

In other examples, instead of using a physical management processor, a virtual management processor can be created by the program upgrade management engine 104 to perform power control of the VMs.

Once all of the VMs in the cluster 108 of computing nodes are powered on, the program upgrade management engine 104 can install (at 214) the new version of the program (e.g., Program v2) into the VMs.

As part of the installation of the new version of the program, the program upgrade management engine 104 sets (at 216) a configuration of the new version of the program. The configuration of the new version of the program can include network addresses of the computing nodes 106-1 to 106-N. The network addresses can include Medium Access Control (MAC) addresses, for example.

The MAC addresses of the computing nodes 106-1 to 106-N can differ in the virtual environment and the in the computing environment 102. In the virtual environment, the MAC addresses can include virtual MAC addresses assigned to the VMs 116-1 to 116-N. In the computing environment, the MAC addresses are "real" MAC addresses, i.e., the MAC addresses to be used during normal operation of the cluster 108 of computing nodes. The virtual MAC addresses and the real MAC addresses are different.

Using virtual MAC addresses during the installation and configuration of the new version of the program (Program v2) in the virtual environment and different real MAC addresses during execution of the current version of the program (Program v1) in the computing environment 102 avoids conflicts (or clashes) in data traffic communicated between the VMs over the virtual network 122 due to execution of Program v2, and data traffic communicated between the computing nodes over the physical network 120 due to execution of Program v1.

Configuring Program v2 as part of program installation can involve testing Program v2 to ensure they satisfy target specifications, such as target specifications from a customer. The testing of Program v2 can include executing Program v2.

An example use of MAC addresses is to obtain respective Internet Protocol (IP) addresses that can be dynamically assigned to the computing nodes. In some examples, a device can request an IP address from a Dynamic Host Configuration Protocol (DHCP) server, which may be connected to the physical network 120.

In some examples, the configuration of the new version of the program (Program v2) can use the real MAC addresses of the computing nodes 106-1 to 106-N. However, as part executing Program v2 in the virtual environment, the program upgrade management engine 104 can temporarily change Program v2 in the VMs 116-1 to 116-N to using the virtual MAC addresses. In such examples, the VMs 116-1 to 116-N can request IP addresses from the DHCP server using the virtual MAC addresses. To support the lookup of IP addresses using the virtual MAC addresses, DHCP information (e.g., in the form of a DHCP file) at the DHCP server can be updated, such that the updated DHCP information maps the virtual MAC addresses to respective IP addresses. The updating of the DHCP information at the DHCP server can be performed by the head computing node 106-1 or another entity. Once the configuration of Program v2 in the virtual environment is completed, the DHCP information can be changed back to mapping real MAC addresses to IP addresses (such as by replacing a DHCP file that maps virtual MAC addresses to IP addresses, with another DHCP file that maps real MAC addresses to IP addresses).

In alternative examples, the configuration of the new version of the program (Program v2) can use the virtual MAC addresses assigned to the VMs 116-1 to 116-N in the respective computing nodes 106-1 to 106-N. This configuration can be used in the virtual environment. After the configuration of Program v2 is completed and before rebooting the cluster 108 of computing nodes, the configuration of Program v2 is changed to using real MAC addresses.

Once the installation and configuration of Program v2 is complete, the program upgrade management engine 104 reboots (at 218) the computing nodes 106-1 to 106-N. As part of the rebooting, a user or another entity can select that the computing nodes 106-1 to 106-N boot from a different storage segment, and in particular, the storage segment containing Program v2.

Figure 3:
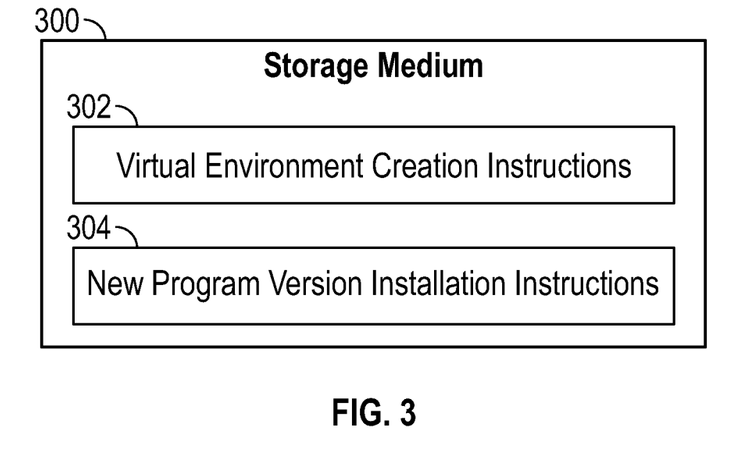
FIG. 3 is a block diagram of a storage medium storing machine-readable instructions according to some examples.

FIG. 3 is a block diagram of a non-transitory machine-readable or computer-readable storage medium 300 storing machine-readable instructions that upon execution cause a system to perform various tasks. The system can include the program upgrade management engine 104 of FIG. 1, for example.

The machine-readable instructions include virtual environment creation instructions 302 to create a virtual environment in a computing environment, where the virtual environment has a configuration corresponding to a configuration of the computing environment. For example, the creation of the virtual environment can include creating VMs in computing nodes of the computing environment, creating virtual storages in the computing nodes, and creating a virtual network. A virtual storage created in a given computing node can include an unused storage segment of a physical storage of the given computing node.

The machine-readable instructions include new program version installation instructions 304 to install, in the virtual environment, a second version of a program while a first version of the program is running in the computing environment, where the installation updates the program during a live operation of the computing environment in which the first version of the program is performing a workload.

In some examples, after installing the second version of the program in a storage segment of a virtual storage, the computing environment is restarted using the second version of the program in the storage segment.

In some examples, the computing environment includes a cluster of computing nodes, where the virtual environment includes virtual sub-environments (e.g., VMs) in respective computing nodes of the cluster of computing nodes, and where the second version of the program is installed in each virtual sub-environment of the virtual sub-environments.

Figure 4:
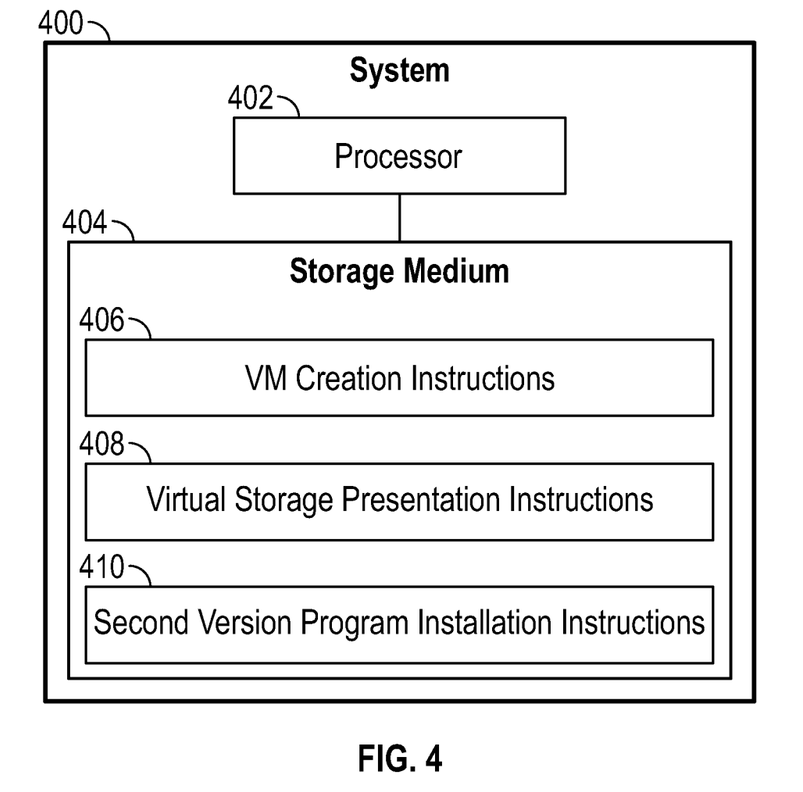
FIG. 4 is a block diagram of a system according to some examples.

FIG. 4 is a block diagram of a system 400 according to some examples. The system 400 can be implemented using a computer or with multiple computers. The system 400 includes a hardware processor 402 (or multiple hardware processors). A hardware processor can include a microprocessor, a core of a multi-core microprocessor, a microcontroller, a programmable integrated circuit, a programmable gate array, or another hardware processing circuit.

The system 400 includes a storage medium 404 storing machine-readable instructions that are executable on the hardware processor 402. Machine-readable instructions executable on a hardware processor can refer to the instructions executable on a single hardware processor or the instructions executable on multiple hardware processors.

The machine-readable instructions in the storage medium 404 include VM creation instructions 406 to create a plurality of VMs in a cluster of computing nodes in which a first version of a program is executable. Each respective VM of the plurality of VMs has a configuration based on a configuration of a respective computing node of the cluster of computing nodes. For example, a name of a virtual network interface of a VM is the name of a physical network interface of the computing node in which the VM executes.

The machine-readable instructions in the storage medium 404 include virtual storage presentation instructions 408 to present virtual storages to respective VMs of the plurality of VMs. Each virtual storage of the virtual storages includes a storage segment of a physical storage, such as an unused storage segment of the physical storage. The storage segment of a virtual storage has a size that matches a size of a storage segment used by the first version of the program that is to be updated.

The machine-readable instructions in the storage medium 404 include second version program installation instructions 410 to install a second version of the program to each virtual storage of the virtual storages using a respective VM, where the installing is to update the program during a live operation of the cluster of computing nodes in which the first version of the program is performing a workload.

In some examples, the machine-readable instructions in the storage medium 404 include instructions to create a virtual network over which the plurality of VMs are to communicate, where data communicated over the virtual network is isolated from data communicated over a network of the cluster of computing nodes during the live operation of the cluster of computing nodes.

Figure 5:
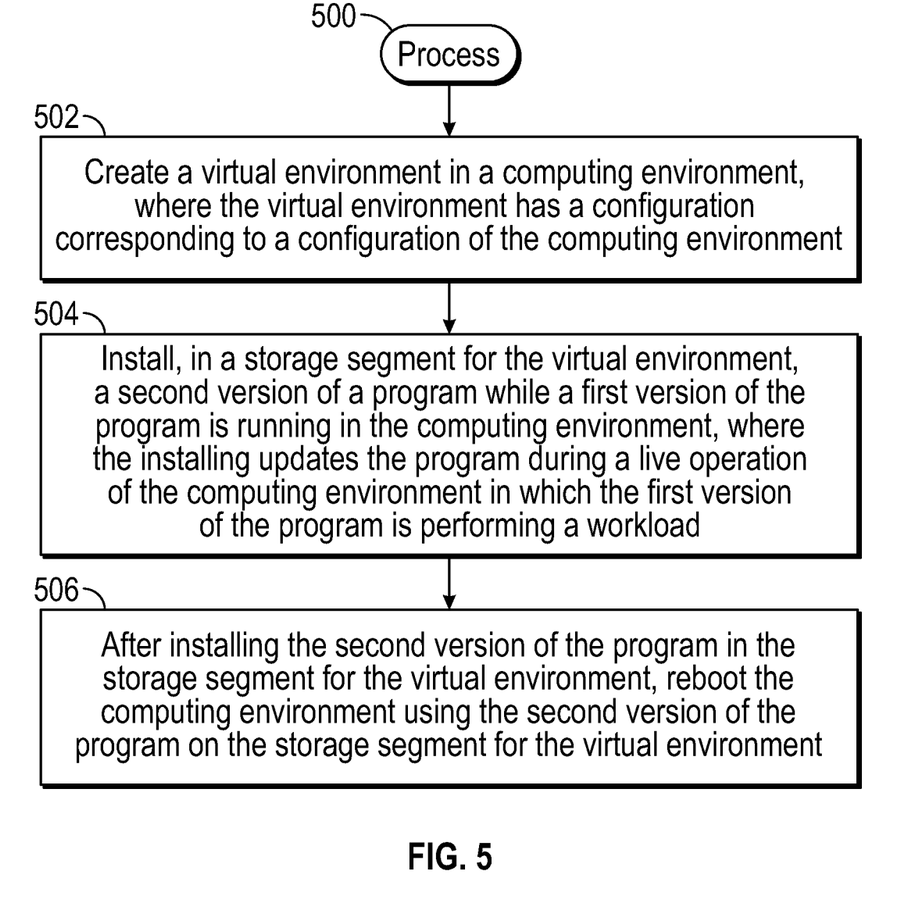
FIG. 5 is a flow diagram of a process according to further examples.

FIG. 5 is a flow diagram of a process 500 according to some examples. The process 500 includes creating (at 502) a virtual environment in a computing environment, where the virtual environment has a configuration corresponding to a configuration of the computing environment. The creation of the virtual environment includes creating virtual entities such as VMs, virtual storages, and a virtual network.

In some examples, the computing environment includes a cluster of computing nodes, where the virtual environment includes virtual sub-environments in respective computing nodes of the cluster of computing nodes, and where the second version of the program is installed in each virtual sub-environment of the virtual sub-environments.

The process 500 includes installing (at 504), in a storage segment for the virtual environment, a second version of a program while a first version of the program is running in the computing environment. The installing updates the program during a live operation of the computing environment in which the first version of the program is performing a workload.

After installing the second version of the program in the storage segment for the virtual environment, the process 500 includes rebooting (at 506) the computing environment using the second version of the program on the storage segment of the virtual environment.

A storage medium (e.g., 300 in FIG. 3 or 404 in FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
create a virtual environment in a computing environment, the virtual environment having a virtual environment configuration corresponding to a configuration of the computing environment, wherein the creating of the virtual environment having the virtual environment configuration corresponding to the configuration of the computing environment comprises:
setting a virtual environment property comprising a size of a storage segment of a virtual storage in the virtual environment to match a property of a physical storage segment of the computing environment; and
install, in the virtual environment with the virtual environment property set to match the property of the physical storage segment of the computing environment, a second version of a program while a first version of the program is running in the computing environment, the installing to update the program during a live operation of the computing environment in which the first version of the program is performing a workload.

2. The non-transitory machine-readable storage medium of claim 1, wherein the instructions upon execution cause the system to create the virtual environment by further creating a virtual machine on a computing node of the computing environment, and wherein the installing of the second version of the program comprises installing the second version of the program in the virtual machine.

3. The non-transitory machine-readable storage medium of claim 1, wherein the instructions upon execution cause the system to create the virtual environment by selecting the storage segment of the virtual storage to use for installing the second version of the program in the virtual environment, the storage segment of the virtual storage having the size that matches a size of the physical storage segment in the computing environment used by the first version of the program, and wherein the installing of the second version of the program comprises installing the second version of the program in the selected storage segment of the virtual storage.

4. The non-transitory machine-readable storage medium of claim 3, wherein the instructions upon execution cause the system to:
after the installing of the second version of the program in the selected storage segment of the virtual storage, restart the computing environment using the second version of the program in the selected storage segment of the virtual storage.

5. The non-transitory machine-readable storage medium of claim 1, wherein the computing environment comprises a cluster of computing nodes, wherein the virtual environment comprises virtual sub-environments in respective computing nodes of the cluster of computing nodes, and wherein the second version of the program is installed in each virtual sub-environment of the virtual sub-environments.

6. The non-transitory machine-readable storage medium of claim 5, wherein the virtual sub-environments comprise virtual machines in the respective computing nodes.

7. The non-transitory machine-readable storage medium of claim 5, wherein each of the virtual sub-environments comprises a virtual storage, and wherein the installing of the second version of the program comprises installing the second version of the program in each of the virtual storages.

8. The non-transitory machine-readable storage medium of claim 5, wherein the instructions upon execution cause the system to:
create the virtual environment by further creating a virtual network over which data between the virtual sub-environments is communicated.

9. The non-transitory machine-readable storage medium of claim 5, wherein the instructions upon execution cause the system to:
create the virtual environment by further creating a virtual network to test operations of the second version of the program in the virtual sub-environments.

10. A non-transitory machine-readable storage medium comprising instructions that upon execution cause a system to:
create a virtual machine in a computing node, the virtual machine having a configuration corresponding to a configuration of the computing node;
install, in the virtual machine, a second version of a program while a first version of the program is running in the computing node, the installing to update the program during a live operation of the computing node in which the first version of the program is performing a workload;
as part of the installing of the second version of the program in the virtual machine, assign a first network address to the virtual machine wherein the first network address differs from a second network address of the first computing node;
configure the second version of the program using the first network address assigned to the virtual machine, wherein the configuring of the second version of the program comprises testing the second version of the program using the first network address; and
after the configuring of the second version of the program is complete, change the second version of the program to use the second network address.

11. The non-transitory machine-readable storage medium of claim 10, wherein the instructions upon execution cause the system to:
change the second version of the program executing in the virtual machine to use the first network address by updating mapping information at a Dynamic Host Configuration Protocol (DHCP) server, the mapping information mapping network addresses to respective Internet Protocol (IP) addresses,
wherein the changing of the second version of the program to use the second network address after the configuring of the second version of the program is complete comprises further updating the mapping information of the DHCP server.

12. The non-transitory machine-readable storage medium of claim 5, wherein a configuration of a virtual sub-environment in a first computing node of the cluster of computing nodes is based on a configuration of the first computing node.

13. The non-transitory machine-readable storage medium of claim 5, wherein the cluster of computing nodes comprises a head computing node and managed computing nodes to be managed by the head computing node.

14. The non-transitory machine-readable storage medium of claim 13, wherein the virtual sub-environments comprise virtual machines, and wherein the instructions upon execution cause the system to:
perform power control of the virtual machines as part of discovering the virtual machines.

15. The non-transitory machine-readable storage medium of claim 1, wherein the creating of the virtual environment having the virtual environment configuration corresponding to the configuration of the computing environment further comprises setting a configuration of a network interface for the virtual environment to match a configuration of a physical network interface in the computing environment.

16. A system comprising:
a processor; and
a non-transitory machine-readable storage medium comprising instructions executable on the processor to:
create a plurality of virtual machines in a cluster of computing nodes in which a first version of a program is executable, wherein each respective virtual machine of the plurality of virtual machines has a configuration based on a configuration of a respective computing node of the cluster of computing nodes, wherein the instructions are executable to create a first virtual machine of the plurality of virtual machines with a configuration based on a configuration of a first computing node of the cluster of computing nodes by:
setting a virtual environment property comprising a size of a storage segment of a first virtual storage for the first virtual machine to match a property of a physical storage segment of the first computing node;
present virtual storages to respective virtual machines of the plurality of virtual machines, each virtual storage of the virtual storages defined on a physical storage segment of a physical storage, wherein the virtual storages comprise the first virtual storage; and
install a second version of the program to each virtual storage of the virtual storages using a respective virtual machine of the plurality of virtual machines, wherein the installing is to update the program during a live operation of the cluster of computing nodes in which the first version of the program is performing a workload, wherein the installing of the second version of the program comprises installing the second version of the program to the first virtual storage.

17. The system of claim 16, wherein the program comprises an operating system or a management program that manages configuring of the cluster of computing nodes.

18. The system of claim 16, wherein the instructions are executable on the processor to:
create a virtual network over which the plurality of virtual machines are to communicate, wherein data communicated over the virtual network is isolated from data communicated over a network of the cluster of computing nodes during the live operation of the cluster of computing nodes.

19. A method comprising:
creating a virtual environment in a computing environment, the virtual environment having a virtual environment configuration corresponding to a configuration of the computing environment, wherein the creating of the virtual environment having the virtual environment configuration corresponding to the configuration of the computing environment comprises:
setting a virtual environment property comprising a size of a storage segment of a virtual storage in the virtual environment to match a property of a physical storage segment of the computing environment;
installing, in the virtual storage in the virtual environment with the virtual environment property set to match the property of the physical storage segment of the computing environment, a second version of a program while a first version of the program is running in the computing environment, the installing to update the program during a live operation of the computing environment in which the first version of the program is performing a workload; and
after installing the second version of the program in the virtual storage in the virtual environment, rebooting the computing environment using the second version of the program in the virtual storage.

20. The method of claim 19, comprising:
as part of the installing of the second version of the program in the virtual storage, assigning a virtual network address for use by the second version of the program when executing in the virtual environment, the virtual network address differing from a real network address of the computing environment;
configuring the second version of the program using the virtual network address, wherein the configuring of the second version of the program comprises testing the second version of the program using the virtual network address; and
after the configuring of the second version of the program is complete, changing the second version of the program to use the real network address.

* * * * *